United States Patent [19]

Awaji

[11] Patent Number: 5,536,298
[45] Date of Patent: Jul. 16, 1996

[54] METHOD OF TREATING FINE PARTICLE DUST IN MANUFACTURING PROCESS OF SEMICONDUCTOR ELEMENTS AND APPARATUS THEREFOR

[76] Inventor: Toshio Awaji, 130-4, Hikino-cho 2-cho, Sakai-shi, Osaka, Japan

[21] Appl. No.: 393,793

[22] Filed: Feb. 24, 1995

[51] Int. Cl.⁶ .......................... B01D 33/15; B01D 46/12
[52] U.S. Cl. ............................ 95/35; 95/270; 95/277; 95/287; 55/329; 55/333; 55/429; 55/477; 55/487
[58] Field of Search ................... 95/31, 34, 35, 95/269, 270, 273, 277, 286, 287; 55/315, 317, 320, 329, 330, 333, 421, 429, 467, 477, 487

[56] References Cited

U.S. PATENT DOCUMENTS

| | | | |
|---|---|---|---|
| 1,689,104 | 10/1928 | Bennett | 55/330 |
| 2,468,354 | 4/1949 | Abbrecht | 55/329 X |
| 2,768,707 | 10/1956 | Campbell | 55/320 X |
| 3,126,263 | 3/1964 | Schwab | 55/329 X |
| 3,174,264 | 3/1965 | McKnab | 55/317 |
| 3,435,597 | 4/1969 | Levy | 55/329 X |
| 4,084,945 | 4/1978 | Chirico | 95/287 |
| 4,881,952 | 11/1989 | Masaru | 55/315 X |
| 5,049,170 | 9/1991 | Parnoff | 55/333 X |

FOREIGN PATENT DOCUMENTS

0529017  11/1957  Italy ........................ 55/477

*Primary Examiner*—Robert Spitzer
*Attorney, Agent, or Firm*—Edwin E. Greigg; Ronald E. Greigg

[57] ABSTRACT

In a method of treating a fine particle dust in a manufacturing process of semiconductor elements wherein the fine particle dust is separated and collected from an air which includes the fine particle dust produced from a source of generating the fine particle dust generated in a process of manufacturing semiconductor elements by filtering air with a laminated filter which comprises at least three filters, each of which having a smaller mesh is arranged to located from an down-stream in order. The method comprising the step of separating removing water and oil by passing the air through a rotary brush prior before the air from the source of generating the fine particle dust is filtered with the laminated filter. The apparatus for carrying out the method.

17 Claims, 6 Drawing Sheets

FIG. 9

METHOD OF TREATING FINE PARTICLE DUST IN MANUFACTURING PROCESS OF SEMICONDUCTOR ELEMENTS AND APPARATUS THEREFOR

BACKGROUND OF THE INVENTION (1) Field of the Invention

The present invention relates to a method of treating a fine particle dust in a manufacturing process of semiconductor elements and an apparatus therefor, and particularly to the method of treating a fine particle dust in a manufacturing process of semiconductor elements and the apparatus therefor which may catch the fine particle dust having a diameter of more than 0.01 μm for a long time and to dispose of it.

(2) Prior Art

Recently, computers and electric control devices utilizing the computers have been progressed remarkably, and it seems that development of these industries expands widely and infinitely. Now, a technique in manufacturing semiconductors, which takes an important position as electronic parts used for a computer, and also the gross of its production are growing remarkably and rapidly.

Germaneium (Ge) and silicon (Si) are normally used as raw materials for the semiconductor elements, and as a special semiconductor element, gallium-arsenic (GaAs) and gallium-phosphorus (GaP) and the like are utilized.

The processes for manufacturing semiconductor elements comprises, for example, a column forming process for forming a column of the semiconductor, a wafer forming process for slicing the column of the semiconductor, an element forming process forming a number of elements by repeating the processes of masking the wafer, forming a thin film thereon, doping and etching the same, and a cutting process for cutting the treated wafer into each of the elements.

In the manufacturing processes, it is known that very fine particle dust of such as 0.01–50 μm is generated. It is also known that such fine particle dust is sometimes harmful and disposal is prohibited in view of prevention of enviromental pollution, and the gas itself including such a fine particle dust is harmful. Further, the fine particle dust sometimes absorbs or adsorps a harmful substance.

The harmful substances generated or used in the semiconductor manufacturing are such as silicon, arsenic, phosphorus, boron, metallic hydrogen, fluorine, halogen, halide, nitrogen oxides and the like, which will be referred to below.

As the silicon harmful gas, it may typically form monosilane ($SiH_4$), dichlorosilane ($SiHCl_2$), silicon trichloride ($SiHCl_3$), silicon tetrachloride ($SiHCl_4$), silicon tetrafluoride ($SiF_4$), disilane ($Si_2H_6$), or TEOS($Si(OC_2H5)$).

As the arsenic harmful gas, it may form arsine ($AsH_3$), arsenic fluoride (III) ($AsF_3$), arsenic fluoride (V) ($AsF_5$), arsenic chloride (III) ($AsCl_5$), or arsenic chloride (V) ($AsCl_5$).

As the phosphorus harmful gas, it may form phosphine ($PH_3$), phosphorus fluoride (III) ($PF_3$), phosphorus fluoride (V) ($PF_5$), phosphorus chloride (III) ($PCl_3$), phosphorus chloride (V) ($PCl_5s$), or phosphorus oxychloride ($POCl_3$).

As the boron harmful gas, it may form diborane ($B_2H_6$), boron trifluoride ($BF_3$), boron trichloride ($BCl_3$), or boron tribromide ($BBr_3$).

As the metallic hydrogen harmful gas, it may form hydrogen selenide ($H_2Se$), monogermane ($GeH_4$), hydrogen telluride ($H_2Te$), stibine ($SbH_3$), or hydrogen tin ($SnH_4$).

As the fluorine harmful gas, it may, for example, form methane tetrafluoride ($CF_4$), methane trifluoride ($CHF_3$),,, methane difluoride ($CH_2F_2$), propane sixfluoride ($C_3H_2F_6$), propane octafluoride ($C_3F_8$).

As the harmful gas of halogen and halide, it may form fluorine ($F_2$), hydrogen fluoride (HF), chlorine ($Cl_2$), hydrogen chloride (HCl), carbon tetrachloride ($CCl_4$), hydrogen bromide (HB), nitrogen trifluoride ($NF_3$), sulfur tetrafluoride ($SF_4$), sulfur sixfluoride ($SF_6$), tungsten sixfluoride (VI)($WF_6$), molybdenum sixfluoride (VI) ($MoF_6$), germanium tetrachloride ($GeCl_4$), tin tetrachloride ($SnCl_4$), antimony pentachloride (V)($SbCl_5$), tungsten sixchloride (VI)($WCl_6$) or molybdenum sixchloride (VI)($MoCl_6$).

As the harmful gas of nitrogen oxides, it may form nitrogen monoxide (NO), nitrogen dioxide ($NO_2$), or dinitrogen oxide ($N_2O$), and as the other harmful gas, it may also form hydrogen sulfide ($H_2S$), ammonia ($NH_3$), and trimethylamine (($CH_3)_3N$).

Further, it is known that fine particle dust may be produced in such a gas including ethane ($C_2H_5$), propane ($C_3H_8$), which have inflammability, and nitrogen ($N_2$), oxygen ($O_2$), argon (Ar), nitrogen dioxide ($NO_2$) and the like.

Nowadays, the mind of preventing a public nuisance is thoroghly permeated. In such a state, it cannot accept to directly discharge the exhaust gas including the above harmful components or fine particle dust into the air, and first of all it is required to remove the particle dust from the exhaust gas and give it suitable treatment so as to change the harmful gas to be a safe and clean gas.

Conventionally, to remove particle dust from an exhaust gas or the like, the priorart has been using a cyclone, a scrubber, a venturi scrubber, a bag filter, an electric collector, a looper and a settler. Therefore, it has been proposed to utilize these devices in order to remove the particle dust from the exhaust gas produced in a manufacturing process of semiconductor elements. However, a function for catching the particle dust is limited. In the case of the cyclone, the diameter of the particle dust caught is more than 3.0 μm, and the scrubber is 1.0 μm. I*n the case of the venturi scrubber, bag filter, and electric collector, the diameter is more than 0.1 μm. also, the looper is 10 μm and the setter is 50 μm. It is a fact that these conventional devices cannot catch the fine particle dust having a diameter of 0.01–50 μm.

Then, the inventor has reached an idea to use a filter having a mesh of 0.01 μm, but the idea has the following problem.

Namely, it is impossible, at present, to form a filter having a mesh of 0.01 μm since the present technique in manufacturing such a filter has just reached a level of producing a filter having at most a mesh of 1 μm.

If it is possible to form a filter having a mesh of about 0.01 μm, such a very small mesh of filter increases a pressure requirement. Therefore, to generate a flow for carrying the particle dust from a source of producing the fine particle dust to the filter, a very big discharging device of high capacity such as a very big blower or fan must be used. As the result, it is found that provision of such a very small mesh of filter is not practical since it necessitates a wide area of installation of the device and that its installation cost becomes high.

Further, since the fine particle dust is caught by the filter and its pressure becomes great for a short time, it becomes necessary to change the filter soon.

Then, prior to the present invention the inventor has researched and invented a method of treating a fine particle dust in a manufacturing process of semiconductor elements and an apparatus therefor, in which an air, introduced from a source of generating the fine particle dust, is filtered by a laminated filter which is formed by laminating more than three filters arranged such that a smaller mesh filter is located down stream of the flow of the air. It is recognized in the test result of this method and apparatus that the particle dust having a diameter of 0.01 µm can be caught certainly as it is expected (See Japanese patent laid-open publication No. 6-296815).

However, it was recognized through repetition of the text that choking of the laminated filter was accelerated more than the inventor had expected and that it necessitated changing of the filter frequently.

Then, the inventor further researched and found that the acceleration of choking the filter was bought by the following fact. Namely, an air including the fine particle dust produced in the process of manufacturing semiconductor elements, included liquids such as an oil leaked from a vacuum pump or an oil rotary or an aqua or oilish liquid for polishing or cutting. The liquids were floating in the state of very small fine mist, and stuck to the inside wall of a duct while the air blown in the duct and separated therefrom due to the flow of the air and then transferred to the laminated filter while they are mixing with the fine particle dust, so that the liquids were adhered to the laminated filter and choked the same.

SUMMARY OF THE INVENTION

The present invention has an object to provide a method of treating a fine particle dust in a manufacturing process of semiconductor elements and an apparatus therefor, which may catch, for a long time, the fine particle dust having a diameter of more than about 0.01 µm while its construction is simple and compact.

By the way, in the specification, the present invention has both meanings which include a method of treating a fine particle dust in a manufacturing process of semiconductor elements and an apparatus for treating a fine particle dust in a manufacturing process of semiconductor elements.

First, it will be described in connection with the method of treating a fine particle dust in a manufacturing process of semiconductor elements(It is simply called as the present invention hereinbelow.).

In the method of treating a fine particle dust in a manufacturing process of semiconductor elements wherein the fine particle dust is separated and collected from an air which includes the fine particle dust produced from a source of generating the fine particle dust in a process of manufacturing semiconductor elements by filtering the air with a laminated filter which comprises more than three filters, each of which having a smaller mesh is arranged to be located from an up-stream to a down-stream position in order, said method comprising the step of separating and removing water and oil by passing the air through a rotary brush before the air from the source of generating the fine particle dust is filtered with the laminated filter.

In this case, it is possible to pass the air from the underside of the rotary brush to the upside thereof while rotating the rotary brush about a vertical axis.

As the rotary brush, it is sufficient to have a construction that water and oil are separated and removed with rotation and its construction is not limited particularly. The brush may take any type of forms such as a disc, a spiral or the like. Further, the rotary brush may be constructed to be rotatable at a fixed position or movable in right and left or up and down.

In the present invention, if required, a laminated member such as a water-absorbing polymer, an oil-absorbing polymer or a combination of water-absorbing polymer and oil-absorbing polymer may be arranged at a bottom of a liquid separation chamber so as to absorb the separated water or oil by means of the laminated member of the water-absorbing polymer, the oil-absorbing polymer or the combination thereof and then dispose of the same.

Further, between the rotary brush and the laminated filter, the air may be passed through an auxiliary filter (an auxiliary dust collector) having a mesh greater than the filter of the upmost stream of the laminated filter, thereby the relatively large particle dust may be caught in advance.

In the present invention, it is possible to seal and enclose the laminated filter catching the fine particle dust with a receptacle for disposal of the dust in order to increase safety and treatment of the used laminated filter for the operators.

Next, it will be described in connection with the apparatus for treating the fine particle dust in a manufacturing process of semiconductor elements (It is simply called as the present invention hereinbelow.).

In the apparatus for treating a fine particle dust in a manufacturing process of semiconductor elements wherein an air which includes the fine particle dust produced from a source of generating the fine particle dust in a process of manufacturing semiconductor elements, is filtered with a dust collector having a laminated filter comprising more than three filters, each of the three filters having a smaller mesh being located from an up-stream to a down-stream in order. Said apparatus comprising a liquid separation device having a cylindrical liquid separation chamber arranged between the source of generating the fine particule dust and the laminated filter, a rotary brush arranged in the liquid separation chamber to be rotatable about an axis of the liquid separation chamber, and driving means for driving the rotary brush.

In the present invention, it is possible to arrange the liquid separation chamber to have a vertical axis, and the liquid separation chamber opens below the rotary brush to provide an inlet for communicating the liquid separation chamber with the source of generating the fine particle dust, and also opens above the rotary brush to provide an outlet for communicating the liquid separation chamber with the dust collector.

As the rotary brush, it is sufficient to have a construction that water and oil are separated and removed with rotation and its construction is not limited particularly. The brush may take any type of forms such as a disc, a spiral or the like. Further, the rotary brush may be rotated at a fixed position or may be movable right and left and/or up and down.

In the present invention, if required, the liquid separation device may provide a laminated member such as a water-absorbing polymer, an oil-absorbing polymer or a combination thereof, which is disposed at a bottom of the liquid separation chamber.

Further, where the liquid separation chamber is separable at a portion thereof which is located lower than the rotary brush, the liquid separation chamber may be easily disassembled and changed. This means that its maintenance becomes very easy.

Furthermore, where an auxiliary filter (an auxiliary dust collector) having a mesh greater than the filter of the upmost stream of the laminated filter for filtering the air, is provided between the liquid separation chamber and the laminated filter, the relatively large particle dust may be caught in advance, so that the laminated filter can be used for a long time.

Further, where a plurality of dust collectors are connected to the outlet of the liquid separation chamber and a dust collection selecting means is provided for selectively introducing the air to one or plural dust collectors selected among the plurality of the dust collectors, the semiconductor elements may be carried out smoothly.

Furthermore, where a disposal receptacle is provided in the dust collector for sealing and enclosing the laminated filter catching the fine particle dust, it is advantageous that it becomes easy to treat and to remove the laminated filter catching the fine particle dust.

Particularly, where the disposal receptacle is constructed separately from a box-like body of the dust collector, and constructed to be inserted in the box-like body or taken out therefrom, it becomes very advantageous that the lamina ted filter may be treated and disposed of very easily.

In this case, it is preferable that the box-like body of the dust collector is constructed to be usable as the disposal receptacle since it simplifies the construction of the dust collector and becomes easy in treatment.

Function:

According to the present invention, when the gas including the fine particle dust is introduced into the liquid separation chamber from the source of generating the fine particle dust and contacted with the rotary brush, the water and oil included in the gas stick to the brush and these are separated from the gas due to a centrifugal force of the rotary brush and then caught by the brush.

Therefore, the water and oil do not flow toward the laminated filter which is arranged downstream of the rotary brush, so that acceleration of clogging of the laminated filter may be prevented due to adherence of the particle dust including the water and oil to the laminated filter. As the result, it becomes possible to extend a cycle of changing of the laminated filter for a long time.

Where the oil and water are removed in such a manner by means of the rotary brush, the pressure loss of the gas flow becomes minimum at the time of separation of the oil and water. This means that it is possible to control the capacity of the blower for generating the gas flow from the source of generating the fine particle dust to the rotary brush and the laminated filter. As the result, it is advantageous in constructing the apparatus compactly. Advantages:

According to the apparatus of the invention, since it comprises the cylindrical liquid separation chamber arranged between the source of generating the fine particle dust and the laminated filter, the rotary brush arranged in the liquid separation chamber to be rotatable about an axis of the liquid separation chamber, the liquid separation device is provided with the driving device for driving the rotary brush, the method of the presention can be practiced such that the water and oil are separated and removed by passing the gas from the source of generating the fine particle dust through the rotary brush before passing the gas through the laminated filter.

According to the method of the present invention, since the gas excluding the water and oil flows through the laminated filter, it is not feared that clogging of the laminated filter due to the water and oil is accelerated. As the result, it becomes possible to catch the fine particle dust of more than 0.01 µm and dispose of the same.

In the apparatus of the invention, where the liquid separation chamber is arranged to have a vertical axis and the liquid separation chamber opens below the rotary brush to provide the inlet for communicating the liquid separation chamber with the source of generating the fine particle dust, and also opens above the rotary brush to provide the outlet for communicating the liquid separation chamber with the dust collector, the rotary brush may be rotated about a vertical axis and the gas may be blown from the underside of the rotary brush to the upperside thereof in practicing the method of the present invention. As the result, it may prevent a part of the water and fine particle dust from moving toward the downstream of the rotary brush, and then the dust can surely be collected.

In this case, the pressure loss of the gas flow becomes minimum at the time of separation of the oil and water. This means that it is possible to control the capacity of the blower for generating the gas flow from the source of generating the fine particle dust to the rotary brush and the laminated filter. As the result, it is advantageous in constructing the apparatus compactly.

In the apparatus of the invention, where the liquid separation device provides a laminated member such as a water-absorbing polymer, an oil-absorbing polymer or a combination of water-absorbing polymer and oil-absorbing polymer, which is disposed at a bottom of the liquid separation chamber, the separated water or oil or both may be absorbed with the polymer and then disposed of together with the polymer. Therefore, it becomes easy to carry out disposal of the separated water, or oil or both.

In the apparatus of the invention, where the liquid separation chamber is separable at a portion thereof which is located lower than the rotary brush, the lower portion of the liquid separation chamber may be removed away while leaving the waste in the separation chamber. As the result, it may reduce an opportunity as little as possible that the operator contacts the waste at the time of removing the waste from the liquid separation device and it may improve safety.

Further, in the apparatus of the invention, where an auxiliary filter having a mesh greater than the filter of the upmost stream of the laminated filter for filtering the air, is provided between the liquid separation chamber and the laminated filter, the method of the present invention for passing the gas through the auxiliary filter having the mesh greater than the filter of the upmost stream of the laminated filter between the rotary brush and the laminated filter. As their result, its changing cycle of the laminated filter can be extended for a long time.

In the apparatus of the invention, where a plurality of dust collectors are connected to the outlet of the liquid separation chamber and a dust collection selecting means is provided for selectively introducing the air to one or plural dust collectors selected among the plurality of the dust collectors, the gas may be blown through the other dust collectors while changing the laminated filter in one of the plural dust collectors, so that its collecting capacity can be maintained greater than a level for a long time and that the laminated filter can be changed without interrupting production of the semiconductors.

In the apparatus of the invention, where a plurality of the laminated filters are arranged in parallel with one another in the dust collection chamber of one or plural dust collectors which is connected to the outlet of the liquid separation device and filter selecting means is provided for selectively introducing the gas to one or plural laminated filters which are selected among the laminated filters in the dust collection chamber, it becomes possible for the gas to flow through the other laminated filters while changing one of the plural laminated filters in the dust collection chamber so as to maintain the capacity of collection of dust greater than a level for a long time Therefore, it is advantageous that the laminated filter may be changed without interrupting production of the semiconductors.

Further, in the apparatus of the invention, where the disposal receptacle for enclosing and sealing the laminated filters catching the fine particle dust is provided with the dust collector, the method of the present invention can be practiced by sealing the laminated filters catching the fine particle dust in the disposal receptacle, and disposal of the same. As the result, it may reduce an opportunity as little as possible that the operator contacts the waste, so as to improve its safety In this case, where the box-like body of the dust collector is constructed to be usable as the disposal receptacle, it may reduce such an opportunity as little as possible that the operator contacts the waste so as to further improve its safety.

The other objects and advantages will be apparent from the description of the embodiments on the basis of the accompanying drawings.

BRIEF DESCRIPTION OF THE DRAWINGS

The drawings show embodiments of the present invention in which.

DETAILED DESCRIPTION OF THE EMBODIMENTS

Figure 1:
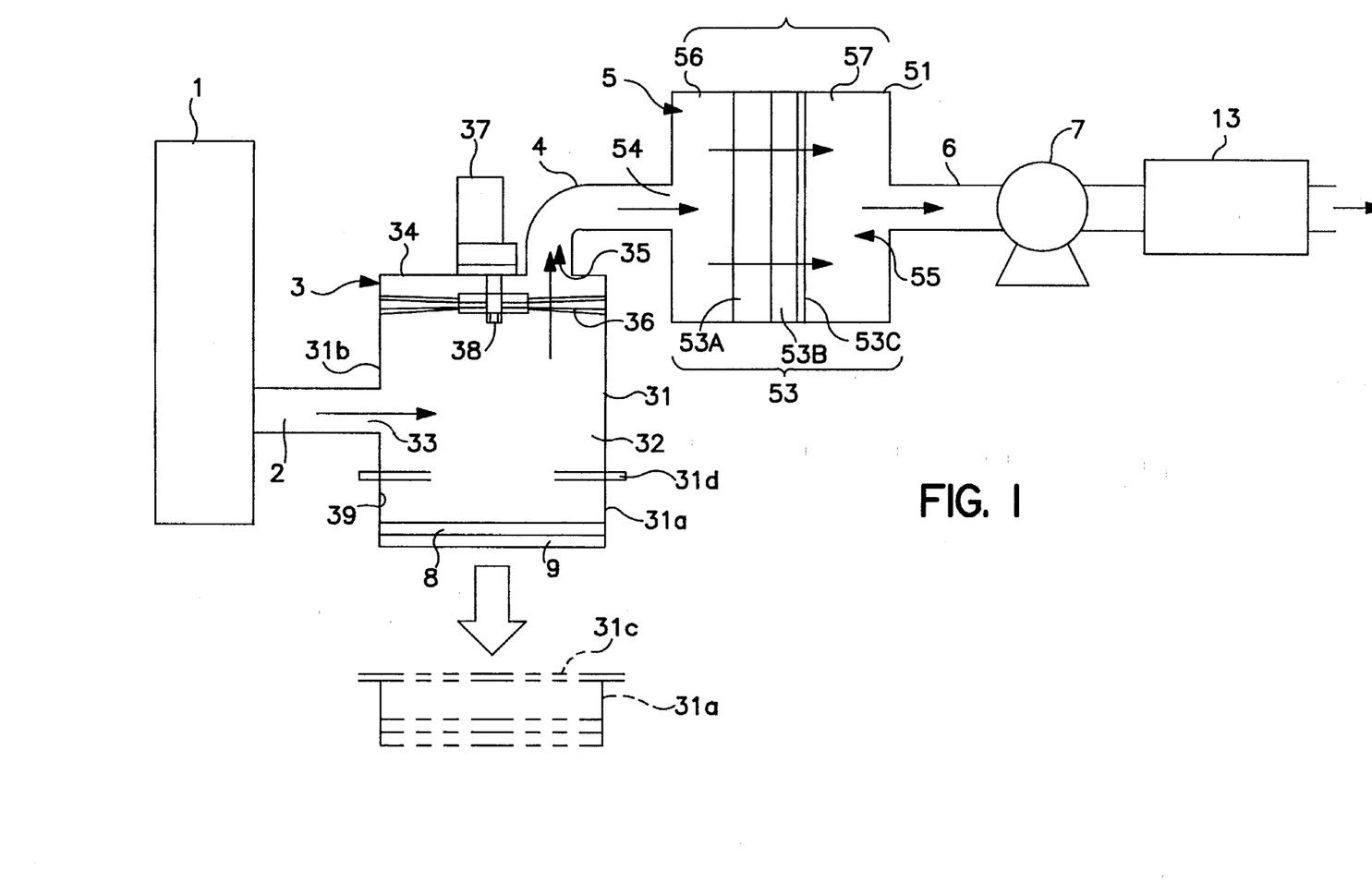
FIG. 1 is a schematic view of the apparatus.

An embodiment of the method of treating a fine particle dust in a manufacturing process of semiconductor elements according to the present invention is shown in FIG. 1. It comprises a liquid separation device 3 which separates oil and water from a gas including a fine particle dust which is introduced by means of an introducing duct 2 from a source 1 of generating the fine particle dust in a process of manufacturing semiconductor elements. A dust collector 5 receive the gas which is separated from the water and oil by means of the liquid separation device 3 via an intermediate duct 4, an exhaust duct 6 is connected to the dust collector 5, a harmful gas treating device 13 disposed in the exhaust duct 6 and a blower 7 disposed-in the exhaust duct 6 upstream of the harmful gas treating device 13.

The blower 7 may be disposed in the introducing duct, the intermediate duct 4, the liquid separation device or the dust collector 5 so long as the blower 7 is constructed to discharge the gas in the air from the source of generating the fine particle dust via the introducing duct 2, the liquid separation device 3, the intermediate duct 4, the dust collector 5 and the exhaust duct 6.

The liquid separation device 3 provides a cylindrical box-like body 31 and a liquid separation chamber 32 is formed in the cylindrical box-like body 31. An inlet 33 is formed at an end of the box-like body 31 to communicate the liquid separation chamber 32 with the introducing duct 2 and at the other end thereof an outlet 35 is formed to communicate the liquid separation chamber 32 with the intermediate duct 4.

A rotary brush 36 in the shape of a disc is arranged rotatably in the liquid separation chamber 32 to cross the liquid separation chamber between the inlet and the outlet, and a driving device 37 for driving the rotary brush 36 is disposed outside the liquid separation chamber 32.

It is possible to arrange the liquid separation chamber and the axis of the rotary brush 36 in a horizontal direction, but it is preferable to arrange the liquid separation chamber 32 and the axis of the rotary brush 36 to be vertical and arrange the inlet 33 to locate below the rotary brush 36 and the outlet 35 to locate above the rotary brush 36 in order to prevent a part each of the fine particle dust, the oil and the water, which is separated from the gas by means of the rotary brush 36, from moving toward the downstream of the rotary brush 36, so as to surely collect the same.

Accordingly, in this embodiment, the liquid separation chamber 32 is arranged along a vertical axis and the rotary brush 36 is disposed to be rotatable about a vertical axis and the inlet 33 opens at the lower periphery of the liquid separation chamber 32 lower than the rotary brush 36 and also the outlet 35 opens at a position of an upper wall 34 of the liquid separation chamber 32 which is shifted eccentrically from a center of the liquid separation chamber 32.

By the way, as the rotary brush, it is possible to form a disc like shape as mentioned above, but instead of this shape, it may be formed in any type of structure such a,s spiral. Further, the rotary brush 36 may be rotatable at a fixed position or it may be constructed to be movable in right and left or up and down directions. In short, it is sufficient that the rotary brush takes a structure which may separate the water and oil from the gas with its rotation and therefore its structure is not limited particularly.

It is possible to arrange the driving device 37 below the liquid separation chamber 32. Where the liquid separation chamber 32 is arranged vertically and the rotary brush 36 is also arranged rotatably about a vertical axis and the inlet 33 is arranged below the rotary brush 36 and the outlet 35 thereabove, the driving device 37 is arranged above the liquid separation chamber 32 since it is advantageous to arrange a central axis 38 of the rotary brush 36 in only the upper portion of the separation chamber 32 in order to easily collect a part each of the oil, the water and the fine particle dust which is separated from the gas by means of the rotary brush 36.

In this embodiment, the driving device 37 is arranged above an upper wall 34, but it is possible to arrange the driving device 37 below the upper wall 34, namely in the liquid separation chamber.

The material of forming the box-like body 31 is not limited. For example, it may use paper, wood, plastics and metal, but it is necessary to provide a mechanical strength, particularly a rigidity which sufficiently bears against the gas pressure.

In this embodiment, the box-like body 31 is formed with plastics which is superior in a mechanical strength, weather resistance, chemical resistance, acid resistance, alkali resistance and thermal resistance.

The shape of the box-like body 31 is not limited particularly, but it is sufficient to form the liquid separation chamber 32 therein which is constructed to be hollow. For example, it may be formed in the shape of a cubic, a rectangular parallelepiped, a cylinder, or an elliptical cylinder. To same manufacturing cost, it is preferable to take a shape as simple as possible.

In this embodiment, the box-like body 31 is formed in the shape of a cylinder which is easily formed by bending a flat plate, a rotary mold forming, or a hand-lay-up manner.

The size of the box-like body 31 may be designed in accordance with a predetermined treating amount per hour, and a capacity such as a changing cycle of an oil-absorbing polymer 8 and a water-absorbing polymer 9, which are referred to hereinafter.

It is sufficient to form the liquid separation chamber 32 in the interior of the box-like body 31. It is possible to provide a partition wall in the box-like body 31 to divide the liquid separation chamber 32. In this embodiment, to simplify its construction and to aim at compactness, the box-like body 31 is constructed to form the peripheral wall of the liquid separation chamber 32.

The material of the rotary brush 36 is not limited particularly, but it may be chosen desirably among those such as wires of natural or plastic fiber, steel, brass, and copper, which are used as a conventional brush.

In this embodiment, to prevent wearness of the peripheral wall of the liquid separation chamber 32 or the tip of each of the brushes of the rotary brush 36 for a long time, plastic brushes are utilized for the rotary brush 36.

When the gas contacts with the rotary brush 36, the oil and water included in the gas are caught between the brushes of the rotary brush 36 and then separated from the gas. The oil and water caught by the rotary brush 36 are transferred toward the peripheral wall 39 of the liquid separation chamber 32 with a centrifugal force due to its rotation of the rotary brush 36 and then flow down toward the bottom of the liquid separation chamber 32 along the peripheral wall 39 due to its weight, and as the result the oil and water are pooled separately up and down.

Further a part of the particle dust included in the gas is also caught between the rotary brush 36 and absorbed in the oil and water which sticks to the brushes and then is transferred to the peripheral wall 39 of the liquid separation chamber 32 together with the oil and water and they flow down to the bottom of the liquid separation chamber 32.

The remaining fine particle dust is collected by the dust collector 5 via the intermediate duct 4 through the outlet 35 while floating in the gas which passes through the brushes of the rotary brush 36.

Where the oil and water are separated in such a manner by means of the rotary brush 36, its pressure loss of gas flow becomes minimum at the time of liquid separation. Therefore, the capacity of the blower for discharging the gas from the source 1 of generating the fine particle dust via the rotary brush 36 and a laminated filter 53, may be controlled minimum. As the result, it is advantageous that the apparatus may be constructed compactly.

In this embodiment, to easily carry out treatment of the oil waste, the water-absorbing polymer 9 is disposed at the bottom of the liquid separation chamber 32 and the water that flow down to the bottom of the liquid separation chamber 32 is absorbed in the water-absorbing polymer, and then the water is taken out from the liquid separation chamber 32 together with the water-absorbing polymer 9 for disposal.

As the water-absorbing polymer used in this embodiment, it is not limited particularly, but it is sufficient to absorb the water and hold it. It may use a conventional water-absorbing polymer.

The manner of arranging the oil-absorbing polymer 8 or the water absorbing-polymer 9 at the bottom of the liquid separation chamber 32, is not limited particularly. Practically, it may take the following manners. For example, the polymer of granule or powder is laid on the bottom of the liquid separation chamber 32 in a suitable thickness. Also, it is possible to dispose a porous body supporting the oil-absorbing polymer or the water-absorbing polymer at the bottom of the liquid separation chamber 32. Also, a plastic file or sheet compounding the oil-absorbing polymer or the water absorbing polymer 9 may be disposed at the bottom of the liquid separation chamber 32.

Among these arrangements to increase operation efficiency at the time of the waste treatment, it is recommendable to use an arrangements such that the porous body supporting the oil-absorbing polymer or the water-absorbing polymer 9 or the plastic file or sheet supporting the oil-absorbing polymer or the water-absorbing polymer 9 is disposed at the bottom of the liquid separation chamber 32.

To take out the waste from the liquid separation chamber 32, the box-like body may provide an opening for communicating the bottom of the liquid separation chamber 32 with the exterior and also a lid for closing the opening tightly. In this embodiment, to reduce an opportunity that the operator contacts with the waste and to increase safety in the waste treating operation, a lower portion 31a of the box-like body 31 lower than the inlet 33 of the box-like body 31 is disassembled from an upper portion 31b thereof via a packing 31d, so that the waste may be carried out together with the lower portion 31a of the box-like body 31 while closing the lower portion 31a of the box-like body 31 with a lid 31c.

However, it is no problem to change the entire liquid separation device 3 when collecting and dumping the waste.

It is possible to form the bottom of the liquid separation chamber 32 to be a funnel, so that the waste can be taken out, any time, from a take-out opening connected to the lower end of the funnel.

The dust collector 5 is provided with a cylindrical box-like body 51 and a laminated filter 53 is disposed in a dust collection chamber 52 which is formed in the interior of the box-like body 51. An introducing inlet 54 is formed at an end of the box-like body 51 to communicate the outlet 35 of the liquid separation chamber with the collection chamber 52 and an introducing outlet 55 is formed at the other end of the box-like body 51 to communicate the collection chamber 52 with the air via the exhaust duct 6, the blower 7 and the harmful gas treating device 13.

The material of forming the box-like body 51 is not limited. For example, it may practically use paper, wood, plastics and metal, but it is necessary to provide a mechanical strength, particularly a rigidity which sufficiently bears against the gas pressure.

In this embodiment, the box-like body 51 is formed with plastics which is superior in a mechanical strength, weather resistance, chemical resistance, acid resistance, alkali resistance and thermal resistance.

The shape of the box-like body 51 is not limited particularly, but it is sufficient to form the dust collection chamber 52 therein which is constructed to be hollow. For example, it may be formed in the shape of a cubic, a rectangular parallelepiped, a cylinder, or an elliptical cylinder. To save manufacturing cost, it is preferable to take a shape as simple as possible.

Figure 3:
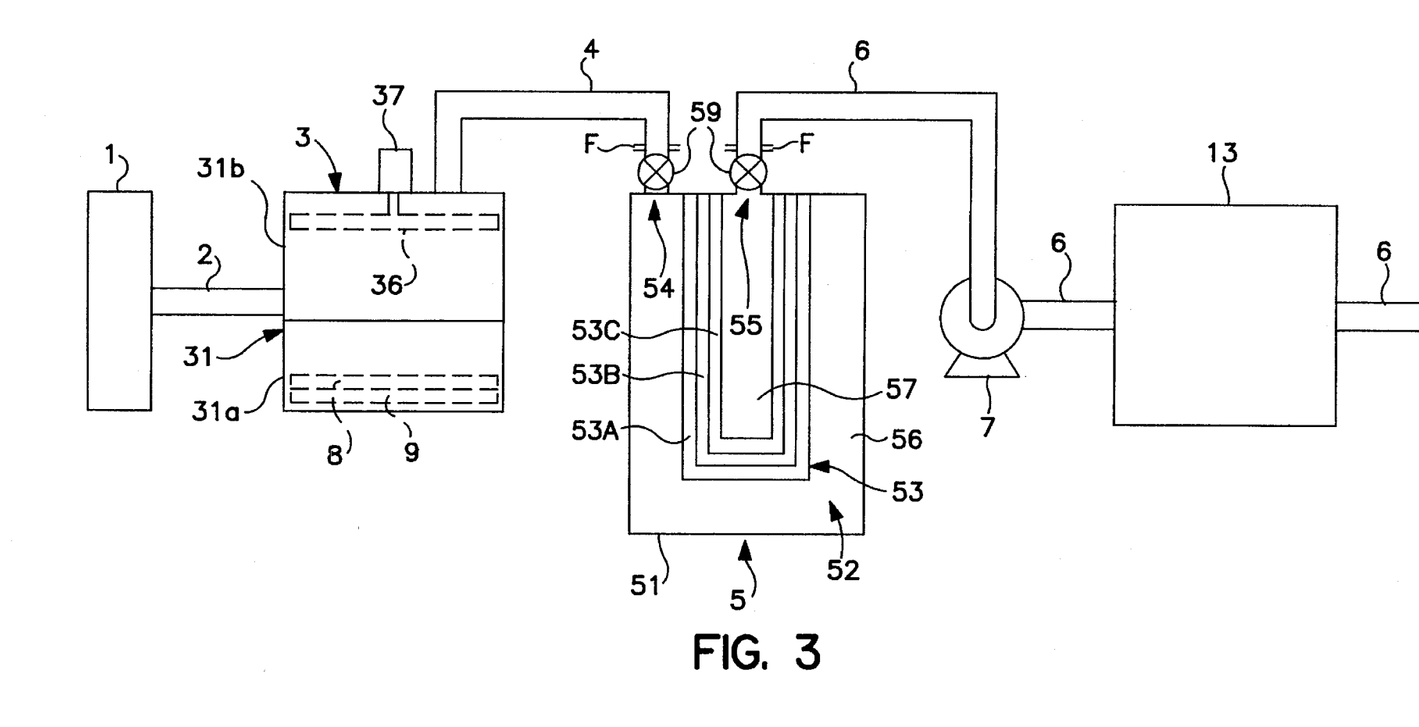
FIG. 3 is a schematic view of a second embodiment of the apparatus.
Figure 9:
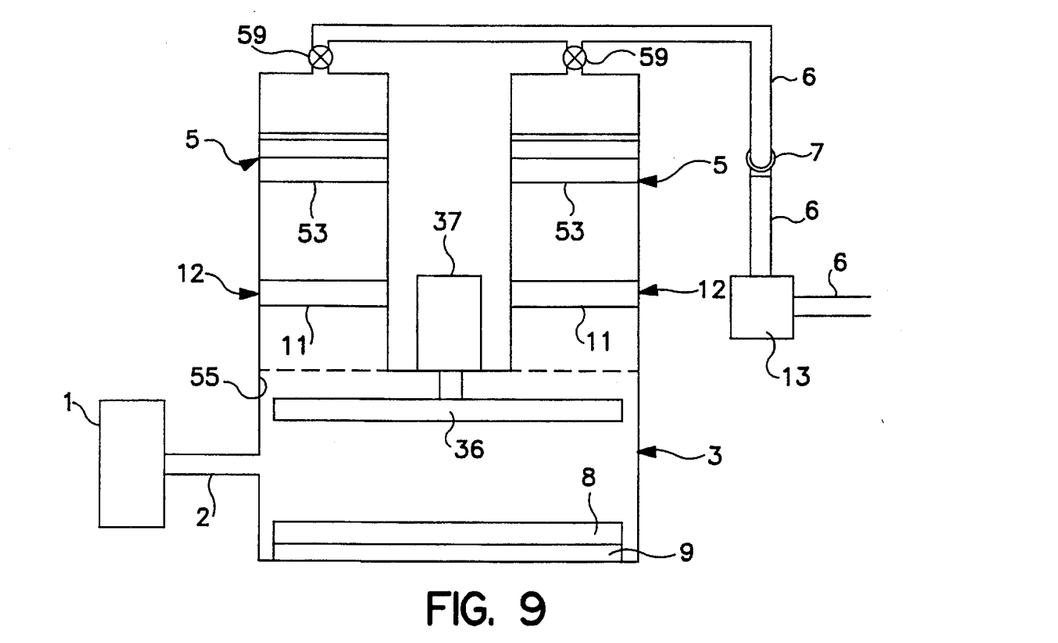
FIG. 9 is a schematic view of an eighth embodiment of the apparatus.

In this embodiment, the box-like body 51 is formed in the shape of a rectangular parallelepiped which is easily formed by bending flat plates and connecting the same to each other, as shown in FIG. 1. However, where the box-like body is formed to be a cylinder having a vertical axis, as shown in FIG. 3 or FIG. 9, it becomes possible to minimize its installation area. Particularly, where it is connected directly to the upper portion of the liquid separation device 3, as shown in FIG. 9, its installation area may be further minimized.

The size of the box-like body 51 may be designed in accordance with a predetermined treating amount per hour, and a capacity such as a changing cycle of a laminated filter 53.

It is sufficient to form the dust collection chamber 52 in the interior of the box-like body 51. It is possible to provide a partition wall in the box-like body 51 to divide the dust collection chamber 52. In this embodiment, to simplify its construction and to aim at compactness, the box-like body 51 is constructed to form the peripheral wall of the dust collection chamber 52.

The laminated filter 53 is disposed dividedly in the two chambers of an introducing chamber 56 and a clean air chamber 57 of the dust collection chamber 52 in the slate of air tightness in order for the gas to flow in the dust collection chamber 52 without a leak.

It is possible to divide the laminated filter 53 into two chambers together with the dust collection chamber 52 by a partition wall which is disposed in the dust collection chamber. In this embodiment, to simplify its construction, the dust collection chamber 52 is divided into two chambers 56 and 57 by only the laminated filter 53.

It is preferable to use more than three layers of filters 53A, 53B and 53C of the laminated filter 53, and in the case of one or two layers of the filters a fine particle dust having a diameter of 0.01 μm cannot, sometime, be caught.

If the filter 53B or 53C having a smaller mesh is arranged on the upstream side of the laminated-filter 53, it is possible to catch the relatively small fine particle dust with its small mesh, but it is a very short time to choke its mesh and shorten its life cycle.

The mesh of the filters 53A, 53B and 53C of the laminated filter 53 may be suitably the determined considering the range of diameter of the fine particle dust to be caught.

In this embodiment, the first filter 53A having a mesh of 200 μm, the second filter 53B having a mesh of between 50–200 μm, and the third filter 53C having a mesh of between 1–50 μm, are laminated.

The thickness of the laminated filter 53 may be determined considering a pressure difference between the source 1 of generating the fine particle dust and an atmospheric pressure, gas permeability or pressure loss of the laminated filter 53, and a mechanical strength of the laminated filter 53. The thickness is preferably more than 5 mm.

The thickness of each of the filters 53A, 53B, and 53C of the laminated filter 53 may also be determined considering a pressure difference between the source 1 of generating the fine particle dust and an atmospheric pressure, gas permeability or pressure loss of each of the filters 53A, 53B, and 53C and a mechanical strength of each of the filters 53A, 53B, and 53C. However, it is preferable to share 20~50% of the thickness of the laminated filter 53 for that of the first filter 53A, the second filter 53B should share 30~50% of the thickness of the laminated filter 53 and also the third filter 53C should share 1~25% of the thickness of the laminated filter 53.

In this embodiment, the thickness of the first filter 53A is about 4 mm and formed with lamination of fibers of polypropylene. The second filter 53B has a thickness of about 3 mm and also formed with lamination of fibers of polypropylene. The third filter 53C has a thickness of about 1 mm and formed with also lamination of fibers of polypropylene and entire the laminated filter 53 is formed to have a thickness of about 8 mm in total.

The shape of the laminated filter 53 is not limited particularly, but it may desirably use plate, cylindrical, conical, truncated conical, or spherical shape. As the plate shape, it may use a flat plate shape, a curved plate shape or a waved plate shape. Where the laminated filter 53 is formed in the cylindrical, conical or truncated conical shape, it may open the both ends of laminated filter 53, and its section may be desirably formed in the shape of circle, ellipse, semicircle, polygon having corners greater than three corners, or star.

In this embodiment, to simplify the description and also the shape of the laminated filter for reducing its manufacturing cost, the laminated filter 53 is formed in a plate shape. However, as shown in FIG. 3, where the laminated filter is formed in a cylinder having a vertical axis, the area of the laminated filter 53 may be board rather than its volume and its installation area may be small.

The material of forming each of the filters 53A, 535 and 53C of the laminated filter 53 is not limited particularly to a polypropylene fiber. Practically, it may use natural fibers, plastic fibers or a mixture of these, an extendable plastic film, foaming plastics, porous material formed by eluating solvable mixing plastics, or porous ceramics. Where fibers are used, its texture may be knitted or woven texture or non-woven texture, and also felt may be usable.

The natural fibers may be sorted to organic and inorganic fibers. As the organic fibers, there may be listed for example a vegetable fiber such as cotton, rayon and pulp, and an animal fiber such as wool, cattle fur, pig fur, and horse fur or silk. Further, as inorganic natural fibers, it may list tip ceramic fibers such as glass fiber, rock wool and asbestos.

The plastic fibers may be sorted to organic fibers and inorganic fibers. As the organic fibers, polyamid fiber, acrylic fiber, polyester fiber, and acetate fiber. As the inorganic fibers, it may list up carbon fiber and boron fiber.

However, as each of the material of the filter, it is preferable to use such a material which does not react with the materials included in the gas, breakdown or corrode.

Lamination of plural layers the filters 53A, 53B and 53C means that each layer of the filters 53A, 53B and 53C is arranged tightly to one another. However, it is not always necessary that the filters 53A, 53B and 53C are adhered to one another integrally by means of for example adhesion.

It is possible to reinforce the laminated filter 53 by a reinforcing member. As the reinforcing member, it may list up a punched plate and net made of metal and plastics. The reinforcing member may be fixed to any of the filters of the laminated filter 53 by means of adhesion, bolt, rivet or engaging means. However, it may not be fixed to any one of the filters.

The laminated filter 53 may be reinforced by means of impregnation of resin. In this case, the resin may be impregnated in one of the filters, the plural filters or all of the filters.

As mentioned above, the oil and water and a part of the particle dust are removed from the gas which is introduced from the source 1 of generating the fine particle dust into the dust collector chamber 52 via the liquid separation device 3 and the intermediate duct 4. However, the gas includes particularly a lot of the particle dust having a diameter of more than 0.01 µm.

Figure 2:
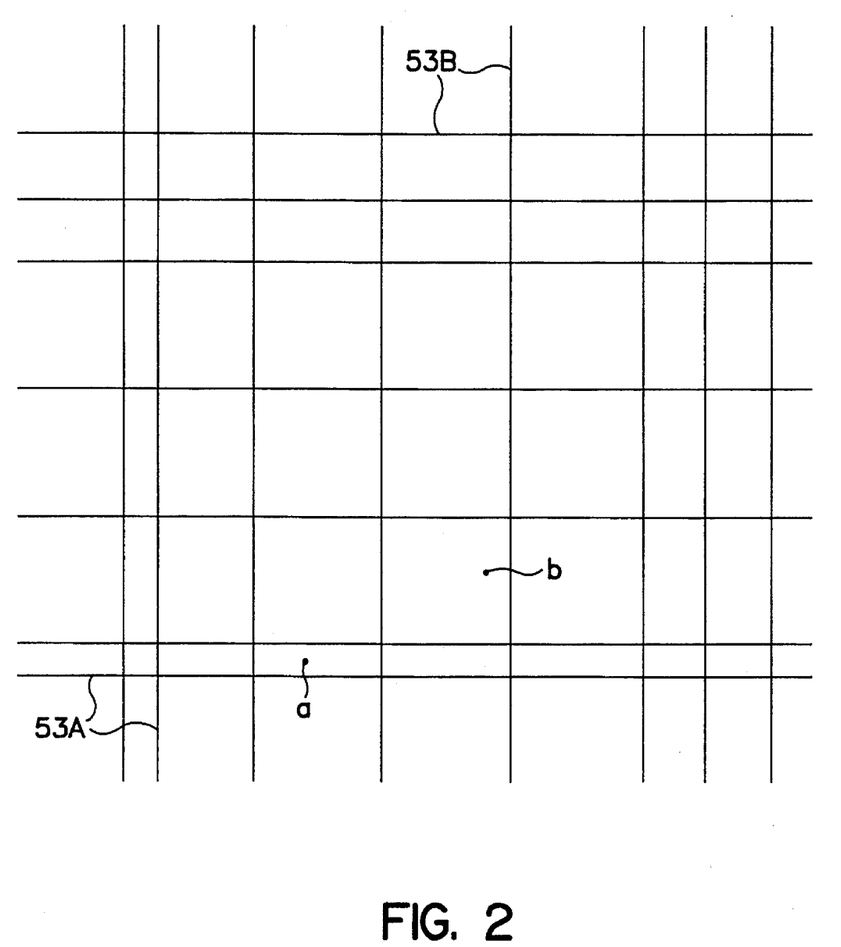
FIG. 2 is a schematic view showing the relationship between the first layer and the second layer of a filter.

When the gas including the fine particle dust flows into the laminated filter 53, as shown in FIG. 2, all of the dust having a diameter greater than the mesh a of the first filter 53A may be caught by the first filter 53A and then the area of the mesh a choked by the caught dust increases gradually.

Accordingly, the leveled size of the mesh a of the first filter 53A becomes small. Provided that the dust is spherical and the mesh is square, when the dust having the same size as the mesh a of the first filter 53A is caught by the mesh a of the first filter 53A, the mesh choked with the dust allows the dust to pass therethrough, said dust having less than the size which multiplies the size of the mesh by 0.01.

The value of the mesh shows a theoretical limit of diameter for collection of dust in such a state that the first filter 53A is almost choked. In the state, its pressure loss becomes very large, and it becomes necessary to provide a blower 7 which is very big and has a high capacity for flowing the gas including the fine particle dust to the laminated filter 53.

Then, to make it compact and small-sized for the apparatus, actually the term of changing the laminated filter 53A is set while its pressure loss is small, so that the blower 7 may not be given an overload within the term of changing the laminated filter 53A.

As shown in FIG. 2 in schematic view, the boundary between the first filter 53A and the second filter 53B, the mesh a of the first filter 53B is divided by the mesh b of the second filter 53B, which is smaller than the mesh a. A part of the mesh b of the second filter 53B is divided by the mesh a of the first filter 53A.

Therefore, the leveled value of the size of the mesh at the boundary between the first filter 53A and the second filter 53B, becomes smaller than the size of the second filter 53B and then a lot of the dust having the size smaller than the mesh b of the second filter 53B, may be caught at the boundary. As the result, the substantive size of the mesh at the boundary becomes relatively smaller than the size of the mesh b of the second filter 53B.

The boundary between the final filter (the third filter 53C in this embodiment) and the filter 53B, which is positioned prior to the final filter, the substantive size of the mesh is determined according to a number of layers of the filters 53A 53B and 53C and each of the sizes of the meshes a, b, and c, and then a limit diameter of dust collection of the laminated filter 53 may be determined.

Actually, it is possible to manufacture only the final filter 53C having the mesh greater than 1 µm. However, the limit diameter of dust collection may be set about 0.01 µm~50 µm by suitably selecting the size of the mesh of the second filter 53B and the mesh of the third filter 53C. In this embodiment, the limit diameter of dust collection becomes set to be 0.01 µm.

Since the oil and water are removed from the gas introduced into the laminated filter 53, it is not afraid that the oil and water do not stick to the laminated filter 53. This means that progression of choke of the laminated filter 53 is not accelerated due to the oil and water. Therefore, the fine particle dust of more than 0.1 µm can be caught for a long time.

In this invention, the layers of the filters 53A, 53B and 53C of the laminated filter 53 are not limited to three, but they may be more than four.

Since the gas excluding the oil, water and fine particle dust includes a harmful gas, the gas is introduced to the harmful gas treatment device 13 and given therein a chemical treatment of such as oxidation, reduction, neutralization, or adsorption and absorption by active carbon and zeolite, so as to make it clean and discharge the same in the air from the exhaust duct 6.

Figure 4:
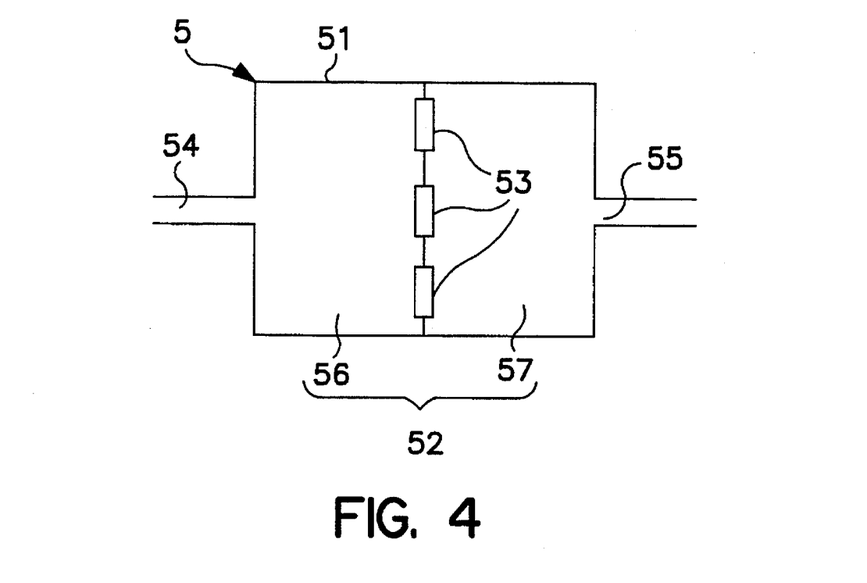
FIG. 4 is a schematic view of a third embodiment of the dust collector.
Figure 5:
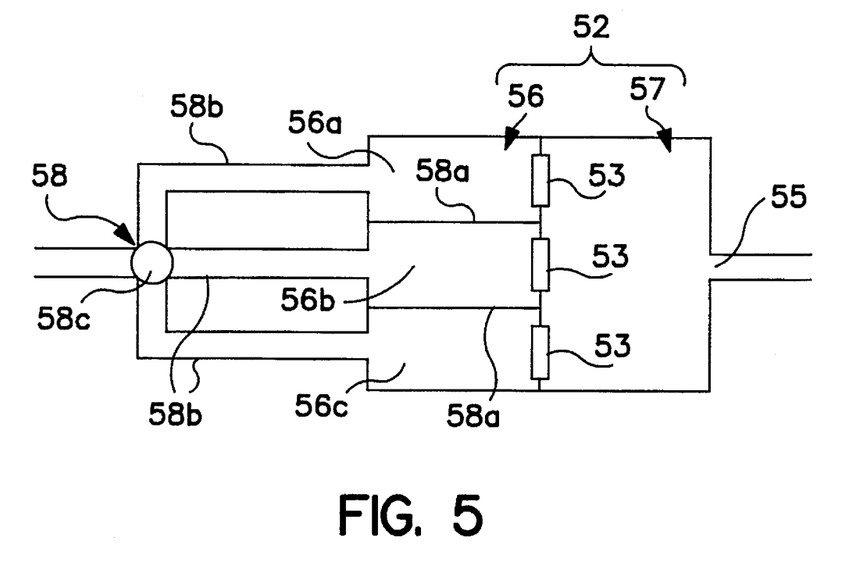
FIG. 5 is a schematic view of a fourth embodiment of the dust collector.
Figure 6:
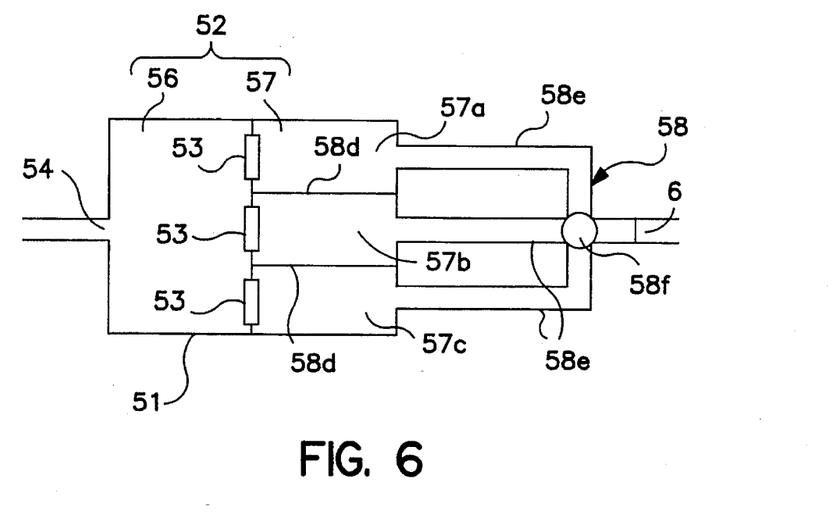
FIG. 6 is a schematic view of a fifth embodiment of the dust collector.

In the apparatus, it is sufficient to arrange the single laminated filter 53 in the single dust collection chamber 52, but as shown in FIGS. 4 to 6, of schematic views, it is no problem to arrange a plurality of the laminated filters 53 in the single dust collection chamber 52 in parallel with one another.

Where a plurality of the laminated filters 53 are arranged in the single dust collection chamber 52 parallelly, as shown in FIGS. 5 and 6, it may provide filter selection means 58 for selectively introducing the gas to one or the plurality of laminated filters 53 selected among the plural filters 53. While changing one of the plural laminated filters 53 among them, the gas may flow through the other laminated filters 53 so as to keep its efficiency greater than a predetermined level for a long time. As the result, the laminated filters 53 can be changed without interrupting the process of manufacturing semiconductor elements.

It is sufficient to construct the filter selection means 58 such that it may introduce the gas selectively to one or the plural laminated filters 53 which are selected among the plural laminated filters 53 which are arranged in parallel to one another.

For example, as shown in FIG. 5, the filter selection means 58 comprises an introducing chamber 56, partition walls 58a which divide into a plurality of small introducing chambers 56a~56c for the laminated filter 53 (or plural laminated filters), introducing branch passages 58b for communicating each of the small introducing chambers 56a~56c with the intermediate duct, and a direction control valve 58c arranged at a turning point of the branch passages 58b to selectively communicate the small introducing chambers 56a~56c with the intermediate duct.

For example, as shown in FIG. 6, the filter selection means 58 may be comprised of a cleaning chamber 57, partition walls 58d for dividing the cleaning chamber 57 into a plurality of small cleaning chambers 57a~57c for the laminated filter 53 (or plural laminated filters), take-out branch passages 58e for communicating each of the small cleaning chambers 57a~57c with the exhaust duct 6, and a direction control valve 58f arranged at a gathering point of the take-out branch passages 58e to selectively communicate the small cleaning chambers 57a~57c with the exhaust duct 6. Of course, as the filter selection means 58, it is sufficient to select the filters and not limited particularly to a certain construction.

As shown in FIG. 9, it is possible to connect a plurality of the dust collectors 5 to the outlet 55 of the liquid separation device 3, to provide dust collector selection means for selectively introducing the gas to one or the plural dust collectors 5 which are selected among the plural dust collectors so as to direct the gas selectively to one or the plural dust collectors 5 which are selective among the dust collectors, thereby keeping its dust collection efficiency greater than a predetermined value, so that the laminated filter 53 may be changed without interrupting the process of manufacturing semiconductor elements.

In this case, it is possible to construct such that a plurality of laminated filters 53 may be arranged for each of the dust collectors 5, so that the gas may be blown through the selected laminated filters 53.

Figure 7:
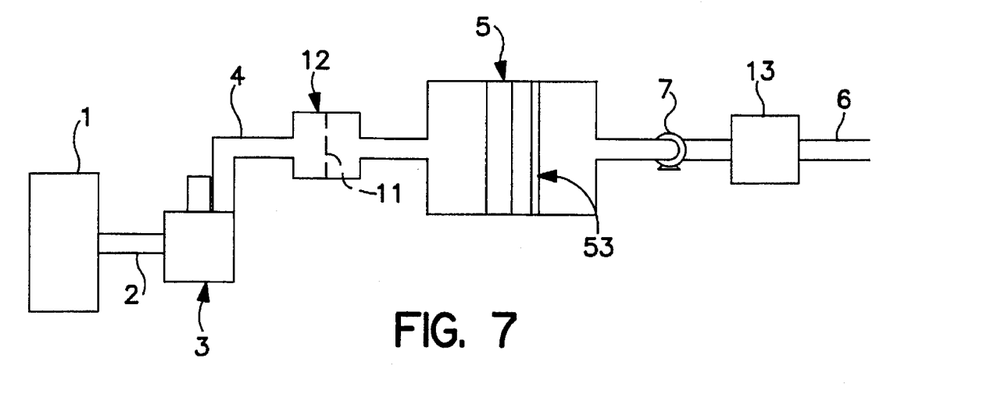
FIG. 7 is a schematic view of a sixth embodiment of the apparatus.
Figure 8:
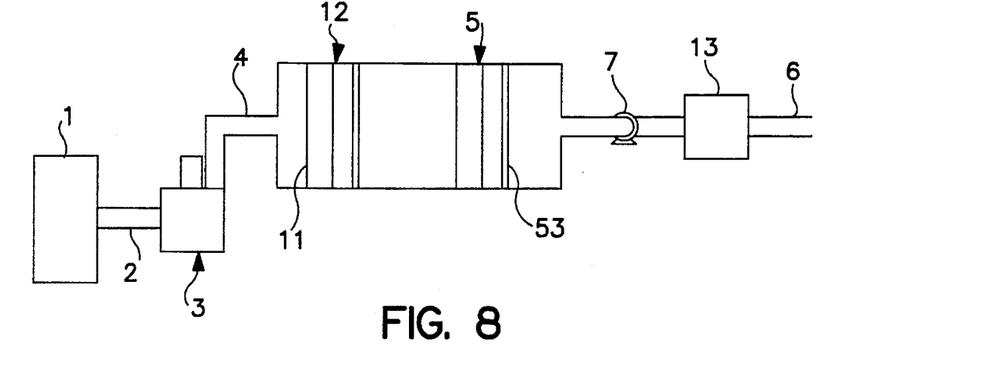
FIG. 8 is a schematic view of a seventh embodiment of the apparatus.

Further, in this embodiment, as shown in each of the schematic views of FIGS. 7 through 9, it is no problem to provide auxiliary dust collection device 11 having another filter which has a mesh greater than the mesh of the first filter 53A of the most upstream of the laminated filter 53, between the laminated filter 53 disposed in the dust collection chamber 52 (or plural dust collection chambers) and the liquid separation device 3. With provision of the auxiliary dust collection device 11, it may further prevent the efficiency of collection of the laminated filter 53 from lowering for a long time.

The auxiliary dust collection device 11 may be disposed multistage. For example, it-may use at cyclone, a scrubber, a venturi scrubber, a bag filter, an electric collector, a looper, a settler and a single layer of filter. Also, a laminated filter which is constructed in the same manner as the laminated filter 53 and has a dust collection limit of a big diameter, may be used.

In this case, since the fine particle; dust having a relatively large diameter may be caught by the auxiliary dust collection device 11, the total amount of the fine particle dust caught by the laminated filter 53 of the dust collector 5 becomes little. This means that a life cycle of the laminated filter 53 for change may further be extended.

Particularly, where a single layer of filter or a laminated filter is used as the auxiliary dust collection device 11, as shown in FIGS. 8 and 9, it is recommendable to arrange the auxiliary dust collection device 11 in the dust collection chamber 52 in order to safely dispose of the auxiliary dust collection device 11 together with the laminated filter 53.

In the present invention, it is preferable to provide a dispusel receptacle which seals therein the laminated filter 53, which catches the fine particle dust, in order to secure safety of many and unspecified persons when disposing of the laminated filter 53 that catches the fine particle dust.

The disposal receptacle may be formed independently of the box-like body 51, and then the box-like body is used repeatedly, so that its maintenance cost may be reduced. However, in this embodiment, in view of increasing safety, as shown in FIG. 3, the introducing inlet 54 and the introducing outlet 55 are connected to the intermediate duct 4 or the exhaust duct 6 with flange F near the box-like body 55, and valves 59 are provided for respectively opening and closing a portion of the introducing inlet 54 which is downstream of the flange F of the introducing inlet 54, and a portion thereof which is upstream of the flange F of the introducing outlet 54. The box-like body 51 is used as the disposal receptacle. Then, the harmful objects are prevented from diffusing from the dust collector 5 by closing these valves 59 at the time of disposal of the waste.

By the way, in FIG. 3, when introducing the gas into the dust collector 5, instead of the above mentioned construction, it is possible to design a position of the valve 55 to be an introducing inlet and a position of the numeral valve 54 to be an introducing outlet.

Where the disposal receptacle is formed independently of the box-like body 51, an opening of suitable size is formed at a portion of the box-like body 51 and a lid is provided for the opening, in order to insert the laminated filter 53, the receptacle or a unit of these parts into the box-like body 51 to take out the same therefrom. This aspect is not shown in the drawings.

Prior to carrying out the dust collection, it is possible to set the receptacle in the dust collection chamber 52 by opening the lid and in such a state that the laminated filter 53 is enclosed therewith or by opening the lid and prior to setting of the laminated filter 53. Further the receptacle may also be inserted in the dust collection chamber 52 at the time of disposal of the laminated filter 53.

Further, it is possible to take out the laminated filter 53, which is to be disposal from the dust collection chamber 52 after sealing and enclosing the same with the receptacle in the dust collection chamber 52, or the laminated filter may be enclosed roughly in the dust collection chamber 52 and then sealed outside the dust collection chamber 52.

The foregoing relates to a preferred exemplary embodiment of the invention, it being understood that other variants and embodiments thereof are possible within the spirit and scope of the invention, the latter being defined by the appended claims.

What is claimed is:

1. In a method of treating a fine particle dust created during manufacture of semiconductor elements wherein the fine particle dust is separated and collected from an air stream which includes the fine particle dust produced from a source of fine particle dust in a process of manufacturing semiconductor elements by filtering the air with a laminated filter which comprises at least three filters, each of which have a smaller mesh and are located from an up-stream position to a down-stream position in order of mesh size, said method comprising the step of;

separating and removing water and oil by passing the fine particle dust air through a rotary brush before the fine particle dust air is filtered by the laminated filter.

2. The method of claim 1, further comprising the step of;

passing the fine particle dust air from the underside of the rotary brush to the upside thereof while rotating the rotary brush about a vertical axis.

3. The method of claim 2, wherein the rotary brush is constructed to be rotatable at a fixed position or movable in right and left or up and down directions.

4. The method of claim 3, further comprising the step of;

passing the fine dust particle air through an auxiliary filter having a mesh greater than the laminated filter in the up-stream position, said auxiliary filter being arranged between the rotary brush and the laminated filter in the up-stream position.

5. The method of claim 3, further comprising the step of;

sealing and enclosing the laminated filter that retains the fine particle dust with a receptacle for disposal.

6. The method of claim 2, further comprising the steps of;

arranging the laminated filter at a bottom of a liquid separation chamber, said laminated filter comprising a water-absorbing polymer, an oil-absorbing polymer or a combination of water-absorbing polymer and oil-absorbing polymer, and absorbing the separated water or oil by means of the laminated filter so as to dispose the laminated filter together with the absorbed water or oil.

7. The method of claim 2, further comprising the step of;

passing the fine dust particle air through an auxiliary filter having a mesh greater than the laminated filter in the up-stream position, said auxiliary filter being arranged between the rotary brush and the laminated filter in the up-stream position.

8. The method of claim 2, further comprising the step of;

sealing and enclosing the laminated filter catching the fine particle dust with a receptacle for disposal.

9. The method of claim 1, wherein the rotary brush is constructed to be rotatable at a fixed position or movable in right and left or up and down directions.

10. The method of claim 9, further comprising the steps of;

arranging the laminated filter at a bottom of a liquid separation chamber, said laminated filter comprising a water-absorbing polymer, and oil-absorbing polymer or a combination of water-absorbing polymer and oil-absorbing polymer, and absorbing the separated water or oil by means of the laminated filter so as to dispose the laminated filter together with the absorbed water or oil.

11. The method of claim 9, further comprising the step of;

passing the fine dust particle air through an auxiliary filter having a mesh greater than the laminated filter in the up-stream position, said auxiliary filter being arranged between the rotary brush and the laminated filter in the up-stream position.

12. The method of claim 9, further comprising the step of;

sealing and enclosing the laminated filter catching the fine particle dust with a receptacle for disposal.

13. The method of claim 1, further comprising the steps of;

arranging the laminated filter at a bottom of a liquid separation chamber, said laminated filter comprising a water-absorbing polymer, an oil-absorbing polymer or a combination of water-absorbing polymer and oil-absorbing polymer, and absorbing the separated water or oil by means of the laminated filter so as to dispose the laminated filter together with the absorbed water or oil.

14. The method of claim 13, further comprising the step of;

sealing and enclosing the laminated filter that retains the fine particle dust with a receptacle for disposal.

15. The method of claim 1, further comprising the step of;

passing the fine dust particle air through an auxiliary filter having a mesh greater than the laminated filter in the up-stream position, said auxiliary filter being arranged between the rotary brush and the laminated filter in the up-stream position.

16. The method of claim 1, further comprising the step of;

sealing and enclosing the laminated filter catching the fine particle dust with a receptacle for disposal.

17. An apparatus for treating a fine particle dust in a manufacturing process of semiconductor elements wherein an air which includes the fine particle dust produced from a source of fine particle dust generated in a process of manufacturing semiconductor elements, is filtered with a dust collector having a laminated filter comprising at least three filters, each of the at least three filters having a smaller mesh being arranged to locate from an up-stream to a down-stream in order of their mesh, said apparatus comprising;

a liquid separation device having a liquid separation chamber arranged between the source of the fine particle dust and the laminated filter, a rotary brush arranged in the liquid separation chamber which is rotatable about an axis of the liquid separation chamber, and driving means for driving the rotary brush.

* * * * *